US012762426B2

(12) United States Patent
Abrahamyan et al.

(10) Patent No.: US 12,762,426 B2
(45) Date of Patent: Oct. 13, 2026

(54) METHOD FOR A DISTRIBUTED LEARNING

(71) Applicants: IMEC VZW, Leuven (BE); VRIJE UNIVERSITEIT BRUSSEL, Brussels (BE)

(72) Inventors: Lusine Abrahamyan, Leuven (BE); Nikolaos Deligiannis, Leuven (BE)

(73) Assignees: IMEC VZW, Leuven (BE); VRIJE UNIVERSITEIT BRUSSEL, Brussels (BE)

( * ) Notice: Subject to any disclaimer, the term of this patent is extended or adjusted under 35 U.S.C. 154(b) by 791 days.

(21) Appl. No.: 18/007,530

(22) PCT Filed: Jun. 1, 2021

(86) PCT No.: PCT/EP2021/064662
§ 371 (c)(1),
(2) Date: Dec. 1, 2022

(87) PCT Pub. No.: WO2021/245072
PCT Pub. Date: Dec. 9, 2021

(65) Prior Publication Data
US 2023/0222354 A1 Jul. 13, 2023

(30) Foreign Application Priority Data
Jun. 3, 2020 (EP) .................................... 20178140

(51) Int. Cl.
*G06N 3/098* (2023.01)

(52) U.S. Cl.
CPC .................................... *G06N 3/098* (2023.01)

(58) Field of Classification Search
CPC ........ G06N 3/098; G06N 3/045; G06N 3/044; G06N 3/084; G06N 3/088; G06N 3/063
See application file for complete search history.

(56) References Cited

U.S. PATENT DOCUMENTS 11,057,318 B1 * 7/2021 Matthews ............... H04L 49/30
12,518,167 B1 * 1/2026 Vivekraja .............. G06N 3/084
(Continued)

FOREIGN PATENT DOCUMENTS

EP 3920097 A1 12/2021

OTHER PUBLICATIONS

Search Report from European Application No. 20178140.8, Nov. 26, 2020.
(Continued)

*Primary Examiner* — Hien L Duong
(74) *Attorney, Agent, or Firm* — Workman Nydegger

(57) ABSTRACT

A computer implemented method for training a learning model by a distributed learning system includes computing nodes. The computing nodes respectively implement the learning model and deriving a gradient information for updating the learning model based on training data. The method involves: encoding, by the computing nodes, the gradient information by exploiting a correlation across the gradient information from the respective computing nodes; exchanging, by the computing nodes, the encoded gradient information within the distributed learning system; determining an aggregate gradient information based on the encoded gradient information from the computing nodes; and updating the learning model of the computing nodes with the aggregate gradient information, thereby training the learning model.

13 Claims, 6 Drawing Sheets

(56) References Cited

U.S. PATENT DOCUMENTS

| | | | | |
|---|---|---|---|---|
| 2019/0325302 | A1 | 10/2019 | Savic et al. | |
| 2020/0234110 | A1* | 7/2020 | Singh | G06N 3/04 |
| 2021/0034922 | A1* | 2/2021 | Chenxi | G06F 18/2148 |
| 2021/0133583 | A1* | 5/2021 | Chetlur | G01C 21/3608 |
| 2021/0194831 | A1* | 6/2021 | Huang | H04L 49/90 |

OTHER PUBLICATIONS

International Search Report from PCT Application No. PCT/EP2021/064662, Nov. 10, 2021.

Fagbohungbe et al., "Efficient Privacy Preserving Edge Computing Framework for Image Classification," arxiv.org, Cornell University Library, May 10, 2020, 9 pages.

Li et al., "An End-to-End Encrypted Neural Network for Gradient Updates Transmission in Federated Learning," arxiv.org, Cornell University Library, Aug. 22, 2019, 8 pages.

Yu et al., "GradiVeQ: Vector Quantization for Bandwidth-Efficient Gradient Aggregation in Distributed CNN Training," Advances in Neural Information Processing Systems, vol. 31, Dec. 3, 2018, 11 pages.

* cited by examiner

METHOD FOR A DISTRIBUTED LEARNING

TECHNICAL FIELD

Various example embodiments relate to a computer-implemented method for training a learning model by means of a distributed learning system. Further embodiments relate to a computer program product implementing the method, a computer-readable medium comprising the computer program product and a data processing system for carrying out the method.

BACKGROUND

Deep learning is part of machine learning methods based on artificial neural networks with representation learning. Deep learning architectures such as Deep Neural Networks, DNN, Recurrent Neural Networks, RNN, Graph Neural Networks, GNNs, and Convolutional Neural Networks, CNN, have been applied to a vast variety of fields including computer vision, speech recognition, natural language processing, data mining, audio recognition, machine translation, bioinformatics, medical image analysis, and material inspection.

Training deep neural networks on large datasets containing high-dimensional data samples requires enormous computation. A solution is distributed learning also known as federated learning or collaborating learning. Distributed learning addresses critical issues such as data privacy, data security, data access rights, and access to heterogeneous data, by replicating the learning model in several computing nodes or servers. When training such a distributed learning neural network, each computing node processes local data and exchanges gradient information across the system rather than data. The gradient information derived by the computing nodes represents the result of a loss function that allows quantification of the error made by the learning model during training. Considering that the learning model is parameterized by a parameter vector and the loss function, the gradient information corresponds to the gradient of the loss function which is a vector-valued function whose values hold the partial derivative of the loss function for the parameter vector. The gradient information is thus a value vector which can be computed by backpropagation techniques and used by gradient-based algorithms such as gradient descent or stochastic gradient descent.

Exchanging gradient information across the computing nodes within the system, however, entails high communication rates and low latency. The problem becomes even more pronounced, when the computing nodes are wireless, as the exchange of gradient information is further limited by the limited bandwidth of the wireless network and the high cost of the mobile data plans.

SUMMARY

Amongst others, it is an object of embodiments of the present disclosure to provide a solution for exchanging gradient information across a distributed learning system with limited communication bandwidth.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by a computer implemented method for training a learning model based on training data by means of a distributed learning system comprising computing nodes, the computing nodes respectively implementing the learning model and deriving gradient information for updating the learning model based on the training data, the method comprising:

- encoding, by the respective computing nodes, the gradient information by exploiting a correlation across the gradient information from the respective computing nodes;
- exchanging, by the respective computing nodes, the encoded gradient information within the distributed learning system;
- determining aggregate gradient information based on the encoded gradient information from the respective computing nodes; and
- updating the learning model of the respective computing nodes with the aggregate gradient information, thereby training the learning model.

In other words, the encoding of the gradient information from the respective computing nodes is not performed independently from one another. Instead, the correlation across the gradient information from the respective computing nodes is exploited. Simply put, the encoding exploits the redundancy of the gradient information across the computing nodes.

By encoding the gradient information in this way, the non-redundant gradient information from the respective computing nodes is derived. This way, a higher compression rate may be achieved. Therefore, a limited amount of gradient information is now exchanged within the distributing learning system. This allows drastically reducing the requirements on the communication bandwidth of the system.

According to an example embodiment, the distributed learning system may operate according to different communication protocols, such as a ring-allreduce communication protocol or a parameter-server communication protocol.

According to an example embodiment, the distributed learning system operates according to a ring-allreduce communication protocol, wherein

- the encoding comprises encoding, by the respective computing nodes, the gradient information based on encoding parameters, thereby obtaining encoded gradient information for a respective computing node;
- the exchanging comprises receiving, by the respective computing nodes, the encoded gradient information from the other computing nodes;
- the determining comprises, by the respective computing nodes, aggregating the encoded gradient information from the respective computing nodes and decoding the aggregated encoded gradient information based on decoding parameters.

According to the ring-allreduce communication protocol, each computing node in the distributed learning system is responsible to derive the aggregate gradient information by processing the encoded gradient information from all computing nodes. Accordingly, the respective computing nodes are configured to encode and decode gradient information by exploiting the correlation across the gradient information from the respective nodes.

For this purpose, each computing node encodes its gradient information based on encoding parameters. The encoded gradient information is then exchanged with the other computing nodes in the system. The respective computing nodes thus receive the encoded gradient information from the other computing nodes. To update their respective learning model, the respective computing nodes derive the aggregated gradient information. This is achieved, by first aggregating the encoded gradient information from the respective computing nodes and then decoding resulting gradient information to obtain the aggregated gradient information.

According to an example embodiment, the distributed learning system operates according to a parameter-server communication protocol, wherein the encoding comprises selecting, by the respective computing nodes, most significant gradient information from the gradient information, thereby obtaining a coarse representation of the gradient information for the respective computing nodes, and encoding, by a selected computing node, the gradient information based on encoding parameters, thereby obtaining encoded gradient information;

the exchanging comprises receiving, by the selected computing node, the coarse representations from the other computing nodes;

the determining comprises, by the selected computing node, decoding the coarse representations and the encoded gradient information based on the decoding parameters, thereby obtaining decoded gradient information for the respective computing nodes, and aggregating the decoded gradient information.

In the parameter-server communication protocol, the distributed learning system is organized in a server-worker configuration with, for example, a selected computing node acting as a server and the other nodes acting as workers. In such a configuration, the selected node is responsible to derive the aggregate gradient information by processing the encoded gradient information from all computing nodes. Accordingly, the selected node is configured to both encode and decode gradient information by exploiting the correlation across the gradient information from the respective nodes, while the worker nodes are configured to only encode gradient information.

For this purpose, the respective computing nodes, i.e. the worker nodes and the server node, derive a coarse representation of their respective gradient information. The coarse representation is obtained by selecting the most significant gradient information. In addition to that, the selected node encodes its gradient information based on encoding parameters to obtain encoded gradient information. The respective coarse representations are then exchanged within the distributed learning system so that the server node receives the coarse representations from the other nodes. Aggregate gradient information is derived by decoding the coarse representations and the encoded gradient information based on the decoding parameters. The decoded gradient information is then aggregated to derive the aggregated gradient information. To update the learning model of the respective nodes, the server node exchanges the aggregated gradient information with the other nodes.

According to an example embodiment, the distributed learning system operates according to a parameter-server communication protocol, wherein the encoding comprises selecting, by the respective computing nodes, most significant gradient information from the gradient information, thereby obtaining a coarse representation of the gradient information for the respective computing nodes, and encoding, by a selected computing node, the gradient information based on encoding parameters, thereby obtaining encoded gradient information;

the exchanging comprises receiving, by a further computing node, the coarse representations from the respective computing nodes and the encoded gradient information from the selected computing node; and the determining comprises, by the further computing node, decoding the coarse representations and the encoded gradient information based on the decoding parameters, thereby obtaining decoded gradient information for the respective computing nodes, and aggregating the decoded gradient information.

The selected computing node and the other computing nodes act as worker nodes while a further computing node acts as a server node. The respective coarse representations and the encoded gradient information from the worker nodes are forwarded to the server node. The further computing node derives the aggregate gradient information by first decoding the received gradient information and then aggregating the decoded gradient information. To update the learning model of the respective worker nodes, the server node exchanges the aggregated gradient information with the other nodes.

According to an example embodiment, the method further comprising, by the respective computing nodes, compressing before the encoding the gradient information.

The compression is performed by each computing node independently thereby leveraging the intra-node gradient information redundancy. Various compression methods known in the art such as sparsification, quantization, and/or entropy coding may be applied. By compressing the gradient information prior to its encoding, the amount of gradient information is further reduced.

According to an example embodiment, the method further comprising training an encoder-decoder model at a selected computing node based on the correlation across gradient information from the respective computing nodes.

A node within the system is selected to implement an encoder-decoder model. In distribution learning system operating according to the parameter-server communication protocol, the selected node may be the node acting as a server node. In a distributed learning system operating according to the ring-allreduce communication protocol, the selected computing node may be any of the computing nodes within the system.

By training the encoder-decoder model based on the gradient information correlation across the computing nodes, the redundant and non-redundant gradient information may be exploited.

According to an example embodiment, the training further comprises deriving the encoding and decoding parameters from the encoder-decoder model.

Depending on the communication protocol employed by the distributed learning system, one or more encoding and decoding parameters are derived. In distribution learning system operating according to the parameter-server communication protocol, one set of encoding parameters and a plurality of sets of decoding parameters are derived, wherein the number of the decoding parameters sets corresponds to the number of the worker nodes in the system. In distribution learning system operating according to the ring-allreduce communication protocol, a plurality of sets of encoding parameters and one set of decoding parameters are derived, wherein the number of the encoding parameters sets corresponds to the number of the computing nodes in the system.

According to an example embodiment, the training further comprises exchanging the encoding and decoding parameters across the other computing nodes.

In distribution learning system operating according to the parameter-server communication protocol, the selected node forwards the encoding parameters to worker nodes in the system. In distribution learning system operating according to the ring-allreduce communication protocol, the selected node forwards the encoding and decoding parameters to the respective computing nodes.

According to an example embodiment, the training of the encoder-decoder model is performed in parallel with the training of the learning model.

The training of the encoder-decoder model may be done in the background, i.e., in parallel with the training of the learning model. The training of the encoder-decoder model may thus be performed based on the gradient information used for the training the learning model. This allows to efficiently train the encoder-decoder model.

According to an example embodiment, the distributed learning system is a convolutional neural network, a graph neural network, or a recurrent neural network.

According to a second example aspect, a computer program product is disclosed, the computer program product comprising computer-executable instructions for causing at least one computer to perform the method according to first example aspect when the program is run on the at least one computer.

According to a third example aspect, a computer readable storage medium is disclosed, the computer readable storage medium comprising the computer program product according to the second example aspect.

According to a fourth example aspect, a data processing system is disclosed, the data processing system being programmed for carrying out the method according to the first example aspect.

The various example embodiments of the first example aspect apply as example embodiments to the second, third, and fourth example aspects.

BRIEF DESCRIPTION OF THE DRAWINGS

Some example embodiments will now be described with reference to the accompanying drawings.

DETAILED DESCRIPTION OF EMBODIMENT(S)

The present disclosure provides a solution for exchanging gradient information for training a learning model across a distributed learning system with limited communication bandwidth. A distributed learning system may be for example a Recurrent Neural Network, RNN, a Graph Neural Network, GNN, or a Convolutional Neural Network, CNN, in which the learning model is replicated in the computing nodes in the system. The computing nodes may be any wired or wireless devices capable of processing data such as mobile phones or servers.

The general principle of distributed learning consists of training the learning model at the computing nodes based on local data and exchanging gradient information between the respective learning models to generate a global learning model. The training is performed in an iterative manner where at each iteration new gradient information is derived based on the local data. The exchange of gradient information may be performed at every iteration or every several iterations. Once the gradient information is exchanged, an aggregate gradient information for updating the respective learning models is derived. The manner in which the gradient information is exchanged within the system and how the aggregated gradient information is derived depends on the communication protocol employed by the system.

The communication protocol may be a Parameter Server, PS, or a Ring-AllReduce, RAR, communication protocol. In the parameter-server communication protocol, the system is organized in a server-worker configuration where a selected node acts as a server node, and the other nodes act as worker nodes. In such a configuration, the server node is responsible to derive the aggregate gradient information by processing the gradient information from all nodes and to distribute the aggregated gradient information to the other nodes. In contrast, in the ring-allreduce communication protocol, each computing node is responsible to derive the aggregate information by processing the gradient information from all nodes and to update its respective learning model with the aggregated information.

Figure 3:
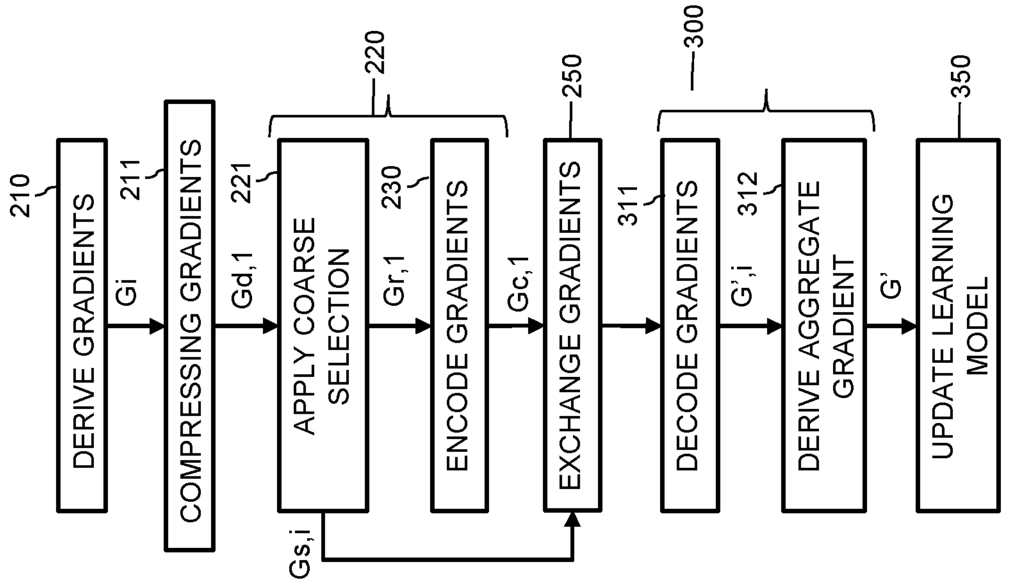
FIG. 3 shows steps according to an example embodiment of the present disclosure for training a learning model by means of the distribution learning system of FIG. 1.
Figure 1:
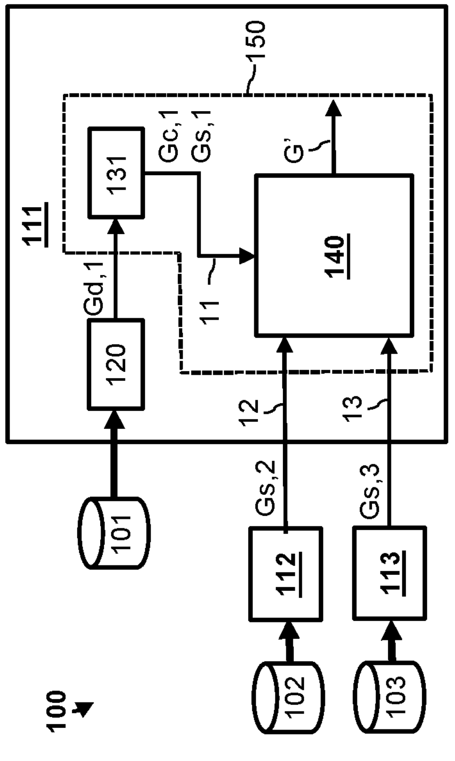
FIG. 1 shows an example embodiment of a distributed learning system operating according to a parameter-server communication protocol according to the present disclosure.
Figure 2:
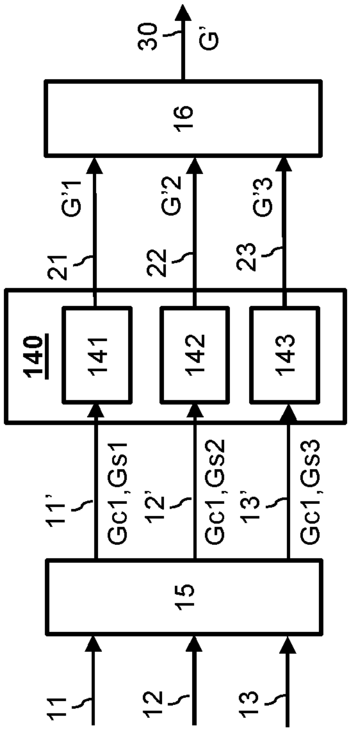
FIG. 2 shows an example embodiment of a decoder employed by the computing nodes in the distributed learning system of FIG. 1.

The method for training a learning model by means of a distribution learning system operating according to the parameter-server communication protocol will be now described with reference to FIG. 1, FIG. 2, and FIG. 3, with FIG. 1 showing the distribution learning system, FIG. 2 showing the decoder employed by the computing nodes in the distributed learning system of FIG. 1, and FIG. 3 showing the various steps performed for training the learning model.

FIG. 1 shows an example architecture of a distributed learning system according to an embodiment. The distributed learning system 100 comprises N computing nodes 111-113, each implementing a learning model 120 and each being configured to derive gradient information, Gi, based on respective sets of training data 101-103. In this example, the system is shown to comprise three computing nodes with node 111 acting as a server node and nodes 112 and 113 acting as worker nodes. In this configuration, all nodes in the system are configured to encode the gradient information and exchange it within the system. In addition to that node 111 which acts as a server node is further configured to receive the gradient information from the other nodes in the system and to determine the aggregate gradient information from the gradient information derived from all nodes in the system. Node 111 thus comprises an encoder 131 and a decoder 140.

The training of the learning model is performed iteratively. At each iteration, the method performs the steps shown in FIG. 3. In a first step 210, each node i derives gradient information, Gi, i=1, . . . , 3, based on their respective sets of training data 101-103. Typically, the gradient information is in the form of a tensor, for example a one-dimensional vector or a higher dimensional tensor which comprises gradient information for updating the learning model 120. In a second step 211, the nodes compress their respective gradient information to obtain compressed gradient information, Gd,i. The compression may be performed by selecting the α % of the gradients with the highest magnitude. Alternatively, the compression may be performed by other known in the art compression methods such as sparsification, quantization, and/or entropy coding. This step 211 is, however, optional, and it may be omitted.

The method proceeds to the step of encoding 220. In this embodiment, the encoding is performed in two steps which may be performed in sequential order or in parallel. In the first step 221, the nodes respectively derive a coarse representation of their gradient information, Gs,i, 11-13. The coarse representation may be derived by, for example, selecting the β % of the gradients with the highest magnitudes. The selection is performed independently at each node. Thus, each node selects the respective the β % of the gradients with the highest magnitudes. The coarse selection may be applied to the compressed gradient information, Gd,i, if the gradient information has been previously compressed, or on the uncompressed gradient information Gi, if the compression step has been omitted. Depending on the bandwidth limitations, the selection may be applied with different degrees of selection rate. A very aggressive selection rate of, e.g., 0.0001% would result in a very compact gradient vector Gs,i containing a limited number of gradient values. By selecting the gradients with the highest magnitudes, the most significant gradient information is extracted. Alternatively, the coarse selection may be performed by applying a coarse information extraction and encoding or another suitable for the purpose algorithm. In the second step 230, the server node, i.e., node 111, encodes its gradient information Gd,1 based on encoding parameters in its encoder 131 to obtain an encoded gradient information Gc,1.

The method proceeds to step 250, where the encoded gradient information is exchanged across the system. For this purpose, nodes 112 and 113 forward their coarse representations Gs,2 and Gs,3 to the server node 111. In the next step 300, the server node 111 derives the aggregate gradient information as follows. First, the encoded gradient information Gc,1 is combined or fused with the coarse representations, Gs,i, by the logic circuit 15. The fusing may be performed by concatenating the respective coarse representations Gs,i from all nodes with the encoded gradient information Gc,1 from the server node or a learnt representation of Gc,1. Instead of concatenating, a elementwise addition or other attention mechanism may be employed. The resulting fused gradient information 11'-13',i.e., one fused gradient vector for each respective node i, are then decoded individual by the decoder 140 to derive three decoded gradient vectors, G',i, 21-23. The decoding step 311 may be performed in a sequential manner or in parallel, as shown in the figure. In the latter case, the decoder 140 comprises three decoders 141-143, one decoder for each node i. Finally, the decoded gradient information G',i are aggregated in step 312. The aggregated gradient information 30 is then forwarded to the other nodes within the system so that all nodes update 350 their respective learning model with the aggregated gradient information, G', 30.

The encoder 131 and decoders 141-143 are respectively set to encode the gradient information by exploiting the correlation across the gradient information from the respective nodes and to decode the encoded information as correct as possible to the original as follows.

For this purpose, the encoder 131 and the decoders 141-143 form part of an autoencoder which is a neural network trained iteratively to capture the similarities or the correlation across the gradient information, i.e., the common gradient information, from the respective nodes. For this purpose, the autoencoder includes a control logic that encourages the capture of common information across the gradient information from different nodes by the encoder. For this purpose, the control logic implements a similarity loss function which estimates the similarities or the correlation across the gradient information from the respective nodes and a reconstruction loss function. The similarity loss function aims at minimizing the difference across the encoded gradient information from the respective nodes, thereby enforcing the extraction of the common information, and the reconstruction loss function aims at minimizing the differences between the respective decoded gradient information and the original gradient information.

Figure 5:
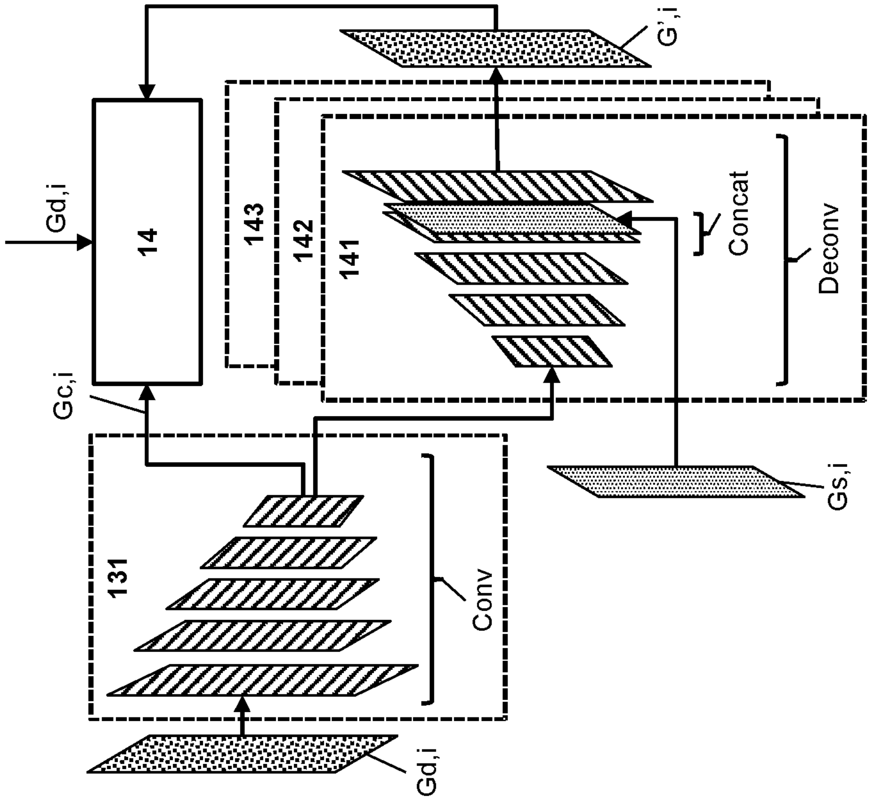
FIG. 5 shows an example architecture of the encoder and the decoder of FIG. 4.
Figure 4:
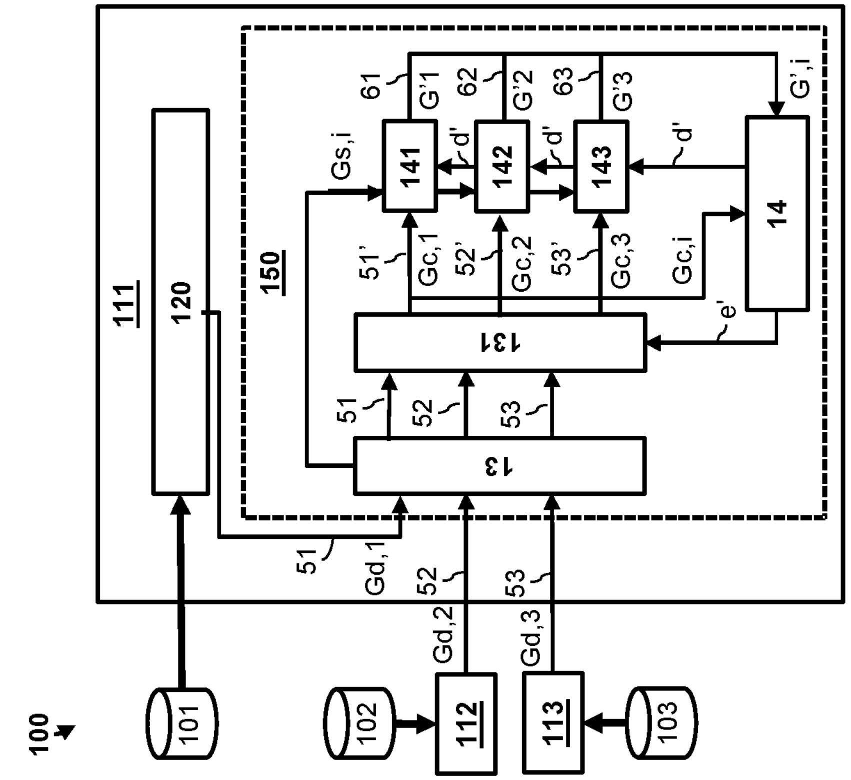
FIG. 4 shows an example embodiment of an encoder and a decoder employed in the distributed learning system of FIG. 1 according to the present disclosure.
Figure 6:
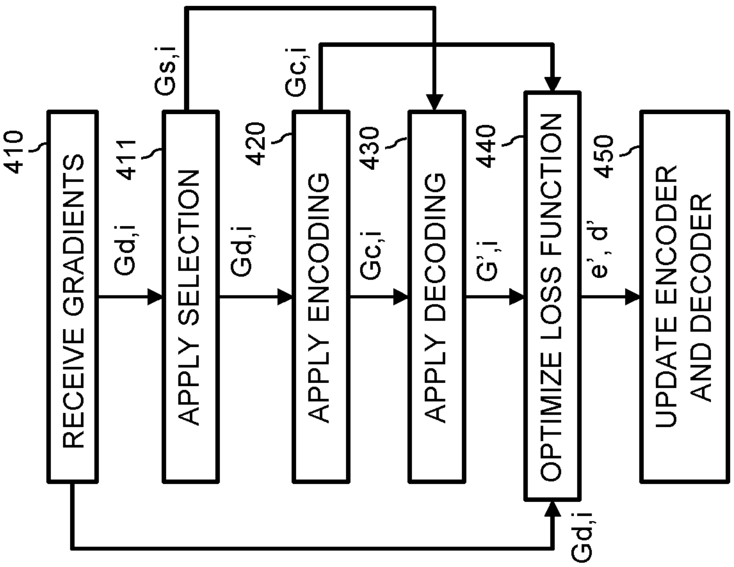
FIG. 6 shows steps according to an example embodiment of the present disclosure for training the encoder and the decoder of FIG. 4.

The autoencoder and the method for training the autoencoder will be now described with reference to FIG. 4, FIG. 5, and FIG. 6. FIG. 4 shows an example architecture of the autoencoder 150, FIG. 5 shows its architecture in more detail, and FIG. 6 shows the steps performed for training the autoencoder.

Those parts of the distributed learning system which are identical to those shown in FIG. 1 and FIG. 2 are denoted by identical reference signs. Herein, the autoencoder 150 comprises a coarse extractor 13, an encoder 131, decoders 141-143, one decoder for each computing node, and a control logic 14 that encourages the encoder 131 to capture the common information across the gradient information from different nodes. An autoencoder architecture with an encoder 131 comprising five convolutional layers each of them having a one-dimensional kernel and three decoders 141-143 respectively comprising five deconvolutional layers each of them a one-dimensional kernel may be adopted.

At each iteration, the autoencoder receives 410 gradient information 51-53 from the respective computing nodes. The gradient information may be uncompressed or compressed by the respective computing nodes by means of conventional compression techniques or by applying a coarse selection, i.e., selecting the α % of the gradients with the highest magnitude. Next, in step 411 a coarse representation Gs,i is derived from respective gradient information Gd,i by, for example, extracting the β% of the gradients with the highest magnitudes or by applying a coarse information extraction and encoding or another suitable for the purpose algorithm. Following the step 411 or in parallel to it, the gradient information from the respective nodes Gd,i is encoded 420 by the encoder 131 in a sequential manner. At each convolutional layer of the encoder, the gradient information is essentially downsampled to obtain an encoded gradient information Gc,i 51'-53'. For example, if the gradient vector Gd,i is a one-dimensional gradient vector comprising 100 values its encoded representation may be a gradient vector comprising 20 gradients. The respective encoded gradient information, Gc,i, 51'-53' are then decoded 430 by the respective decoders 141-143 as follows. At each deconvolutional layer of the decoder, the encoded gradient information is upsampled with the exception that at the fourth convolutional layer the gradient information is first upsampled and then concatenated with its respective coarse representation Gs,i. Once decoding is complete, the method proceeds to step 440 to derive similarities across the gradient information. For this purpose, the encoded and decoded gradient information as well as the original gradient information are all fed into the control logic 14 which minimizes 440 the differences between the respective encoded gradient information and the differences between the respective original and decoded gradient information. By minimizing the respective differences, its ensured that the encoding enforces extraction of the common information across the gradient information and that the decoding enforces correct reconstruction of the encoded gradient information. As a result, one set of encoding parameters and three sets of decoding parameters one set for each decoder are derived. In a final step 450, the encoder and decoders of the selected node, i.e., node 111, are updated with the derived encoding and decoding parameters. The process is repeated until the differences between the respective encoded gradient information and the differences between the respective original and decoded gradient information have been minimized. Finally, once the training of the autoencoder has completed, it is assured that the coarse selectors in the respective nodes (not shown in FIG. 1 and FIG. 2) are set to extract a coarse representation as in step 411 by updating their respective parameters. This may also be done at the installation of the nodes, prior training of the encoder or at any stage during the training of the autoencoder.

Once the autoencoder 150 is trained, the training of the learning model may proceed based on the encoded gradient information as detailed above with reference to FIG. 1, FIG. 2, and FIG. 3. As the training of the autoencoder is performed at node 111 which is also the node responsible for the encoding of the gradient information, Gc,1 and for the determining the aggregate gradient information form the decoded gradient information, there is no need to exchange the encoding or decoding parameters to another node in the system.

Typically, the training of the learning model is performed in two stages. At the initial stage, the learning model is updated using the full gradient information derived from the respective computing nodes. This requires forwarding the full gradient information from the worker nodes to the server node. In the second stage, the learning model is updated with the gradient information compressed using conventional compression techniques. In this stage, the compressed gradient information is forwarded from the respective worker nodes to the server node.

In the present disclosure, the training of the learning model may be performed in two stages or three stages. In the first case, the training starts by updating the learning model using the full gradient information derived from the respective computing nodes. At the same time, i.e. in parallel with the training of the learning model, the encoder-decoder model of the autoencoder may also be trained based on the full gradient information. Once the encoder-decoder model has been trained, e.g. after 1000 or more iterations, the training of the learning model proceeds to the second stage where the learning model is updated based on the gradient information encoded with the encoding parameters derived by the trained encoder-decoder model. Thus, at the second stage, encoded gradient information is exchanged rather than full gradient information.

In the second case, the training starts by updating the learning model based on the full gradient information. After, for example, 1000 iterations, the training of the learning model proceeds to the second stage, where both the learning model and the encoder-decoder model are updated with gradient information compressed using a conventional compression technique. Once the encoder-decoder model of the autoencoder has been trained, e.g. after 100 to 300 iterations, the training of the learning model proceeds to the third stage with updating the learning model based on the gradient information encoded with the encoding parameters derived by the trained encoder-decoder model.

Because the training of the encoder-decoder model in the second case is performed on the compressed gradient information rather than on the full gradient information as in the first case, the training of the autoencoder is completed after a significantly lower number of iterations. Further, the size of the encoded gradient information in the second case may be smaller than the size of the encoded gradient information in the first case.

Figure 7:
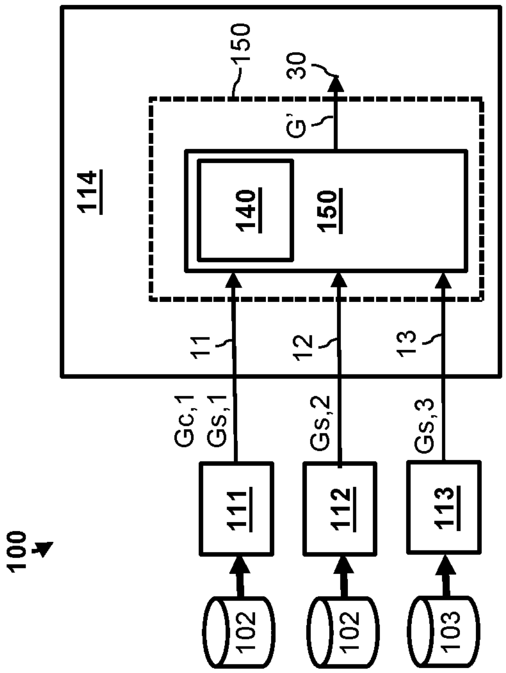
FIG. 7 shows another example embodiment of a distributed learning system operating according to a parameter-server communication protocol according to the present disclosure.

FIG. 7 shows an example architecture of a distributed learning system 100 according to another embodiment. The system 100 comprises N computing nodes 111-113 all acting as worker nodes and a further node 114 acting as a server node. In contrast to the architecture shown in FIG. 1 and FIG. 2, herein the working nodes 111-113 are responsible for deriving and encoding the gradient information, i.e. Gc,1 and Gs,i, while the server node 114 is responsible for determining the aggregated gradient information G' and for the training of the autoencoder 150. Thus, the functionality of node 111 of the embodiment shown in FIG. 1 and FIG. 2 is now distributed to two nodes, i.e. nodes 111 and node 114. According to this embodiment, to train the autoencoder 150, the worker nodes 111-113 forward their respective gradient information, whether uncompressed or compressed to the server node 114 as detailed above with reference to FIG. 1, FIG. 2, and FIG. 3. Once, the training of the autoencoder is completed, the server node 114 forwards the encoding parameters to the worker node responsible for the encoding of the gradient information, i.e. node 111, and if needed the parameters for the coarse selection to the worker nodes 111-113. Thus, once the training of the autoencoder is completed, the training of the learning model 120 proceeds to the next stage where the learning model is updated based on the gradient information encoded based on the derived encoding parameters; i.e. all worker nodes derive 221 coarse representation of their respective gradient information, Gs,i, and the selected node, i.e. node 111, derives 230 the encoded gradient information Gc,1; the worker nodes forward 250 the gradient information 11-13 to the server node 114, which in turn derives 300 the aggregated gradient information, G', 30 therefrom, and forwards it to the worker nodes 111-113 to update 350 their respective learning models as detailed above with reference to FIG. 1, FIG. 2, and FIG. 3.

Figure 8:
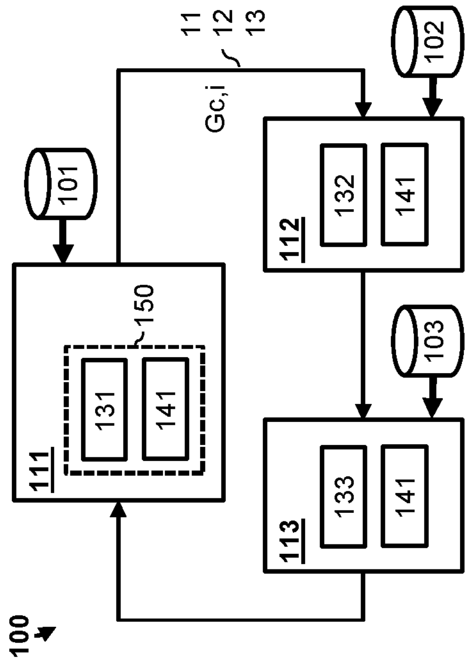
FIG. 8 shows an example embodiment of a distributed learning system operating according to a ring-all reduce communication protocol according to the present disclosure.
Figure 9:
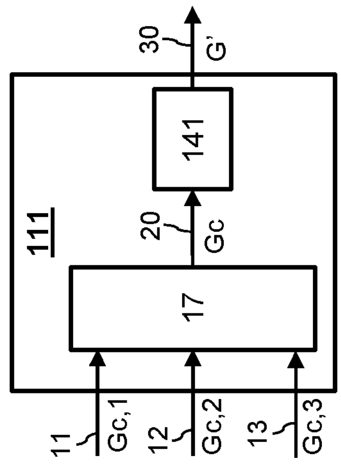
FIG. 9 shows an example embodiment of a decoder employed by the computing nodes in the distributed learning system of FIG. 8.
Figure 10:
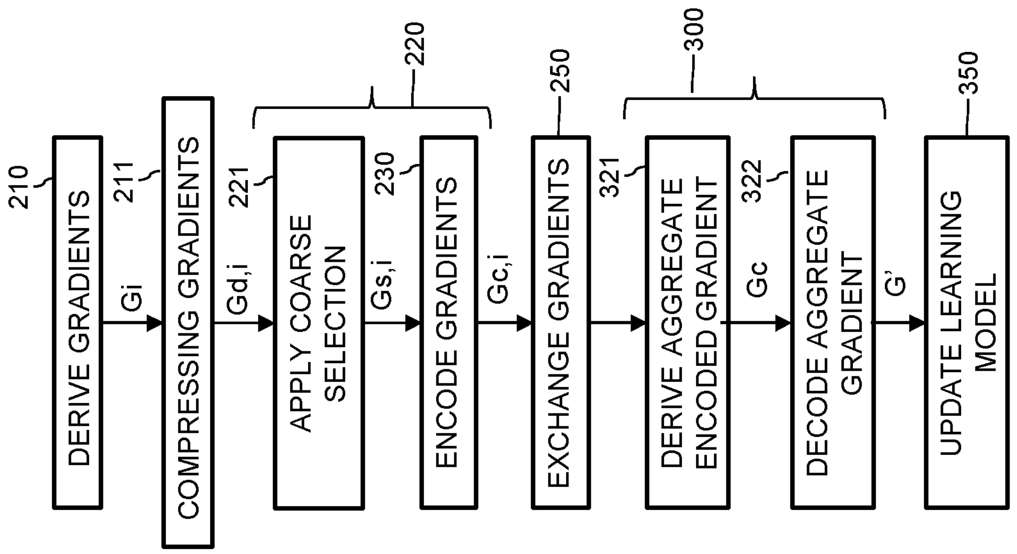
FIG. 10 shows steps according to an example embodiment of the present disclosure for training a learning model by means of the distribution learning system of FIG. 8.

The method for training a learning model by means of a distribution learning system operating according to the ring-allreduce communication protocol will be now described with reference to FIG. 8, FIG. 9, and FIG. 10, with FIG. 8 showing the distribution learning system, FIG. 9 showing the decoder employed by the computing nodes in the distributed learning system of FIG. 8, and FIG. 10 showing the various steps performed for training the learning model. For simplicity, the parts identical to those shown in FIG. 1 and FIG. 2 are denoted by identical reference signs.

As detailed above, in a ring-allreduce communication protocol, each computing node in the system is responsible to derive the aggregate gradient information by processing the encoded gradient information from all nodes within the system. Accordingly, the respective nodes 111-113 are configured to encode and decode gradient information by exploiting the correlation across the gradient information from the respective nodes.

The distributed learning system 100 shown in FIG. 8 comprises N computing nodes 111-113, each implementing a learning model 120 and each being configured to derive gradient information, Gi, based on respective sets of training data 101-103. In this example, the system is shown to comprise three computing nodes 111-113. In this configuration, all nodes in the system are configured to encode the gradient information and exchange it with the other nodes in the system. Thus, all nodes 111-113 are configured to receive the gradient information from the other nodes in the system and to determine the aggregate gradient information G' based on the gradient information from all nodes. For this purpose, each of the nodes 111-113 comprises an encoder and a decoder each pre-set with respective encoding and decoding parameters.

Similar to the other embodiments described above, the training of the learning model is performed iteratively. At each iteration, the method performs the steps shown in FIG. 10. In a first step 210, each node i derives gradient information, Gi, i=1, . . . , 3, based on their respective sets of training data 101-103. Typically, the gradient information is in the form of a tensor, for example a one-dimensional vector or a higher dimensional tensor, which comprises gradient information for updating the learning model 120. In a second step 211, the nodes compress their respective gradient information to obtain compressed gradient information, Gd,i. The compression may be performed by selecting the α % of the gradients with the highest magnitude. Alternatively, the compression may be performed by other known in the art compression methods such as sparsification, quantization, and/or entropy coding. This step 211 is, however, optional, and it may be skipped.

The method proceeds to step 220. The encoding is performed in two steps performed in sequential order. In the first step 221, the nodes respectively derive a coarse representation of their gradient information, Gs,i. The coarse representation may be derived by, for example, selecting the β% of the gradients with the highest magnitudes. The selection is performed at a selected node which selects the β% of its gradients with the highest magnitudes. The selected node is selected at random at each iteration of the training of the learning model. The selected node then shares the indices of the extracted gradients to all remaining nodes in the network, which in turn construct coarse representation of their gradient information based on the shared indices. The coarse selection may be applied to the compressed gradient information, Gd,i, if the gradient information has been previously compressed, or on the uncompressed gradient information Gi, if the compression step has been omitted. Depending on the bandwidth limitations, the selection may be applied with different degrees of selection rate. A very aggressive selection rate of, e.g. 0.0001% would result in a very compact gradient vector Gs,i containing a limited number of gradient values. By selecting the gradients with the highest magnitudes, the most significant gradient information is extracted. Alternatively, the coarse selection may be performed by applying a coarse information extraction and encoding or another suitable for the purpose algorithm. In the second step 230, the respective nodes 111-113 encode their coarse gradient information, Gs,i, based on encoding parameters pre-set in their respective encoders 131-133. Thus, each node derives encoded gradient information Gc,i 11-13. In the next step 250, the nodes 111-113 exchange the encoded gradient information Gc,i within the system. At the end of this step, each node receives the encoded gradient information from the other nodes. In the next step 300, the respective nodes derive the aggregate gradient information G' as follows. First, the nodes 111-113 aggregate 321 the respective encoded gradient information Gc,i. Secondly, the aggregated encoded gradient information Gc 20 is decoded 322 to obtain the aggregated gradient information, G'. As shown in FIG. 9, the aggregation is performed by circuit 17 and the decoding is performed by the decoder of the respective node, i.e. 141. Finally, the nodes 111-113 update 350 their respective learning model with the aggregated gradient information, G'.

Similar to the other embodiments, the encoding and decoding parameters of the encoders 131-133 and decoder 141 are derived by training an autoencoder 150, i.e. a neural network trained iteratively to capture the similarities or the correlation across the gradient information, i.e. the common gradient information, from the respective nodes. For this purpose, one of the nodes, e.g., node 111, comprises the autoencoder 150. The autoencoder 150 includes a control logic 14 that encourages the capture of common information across the gradient information from different nodes by the encoder. Herein, the control logic implements a reconstruction loss function which minimizes the differences between the respective decoded gradient information and the original gradient information.

Figure 12:
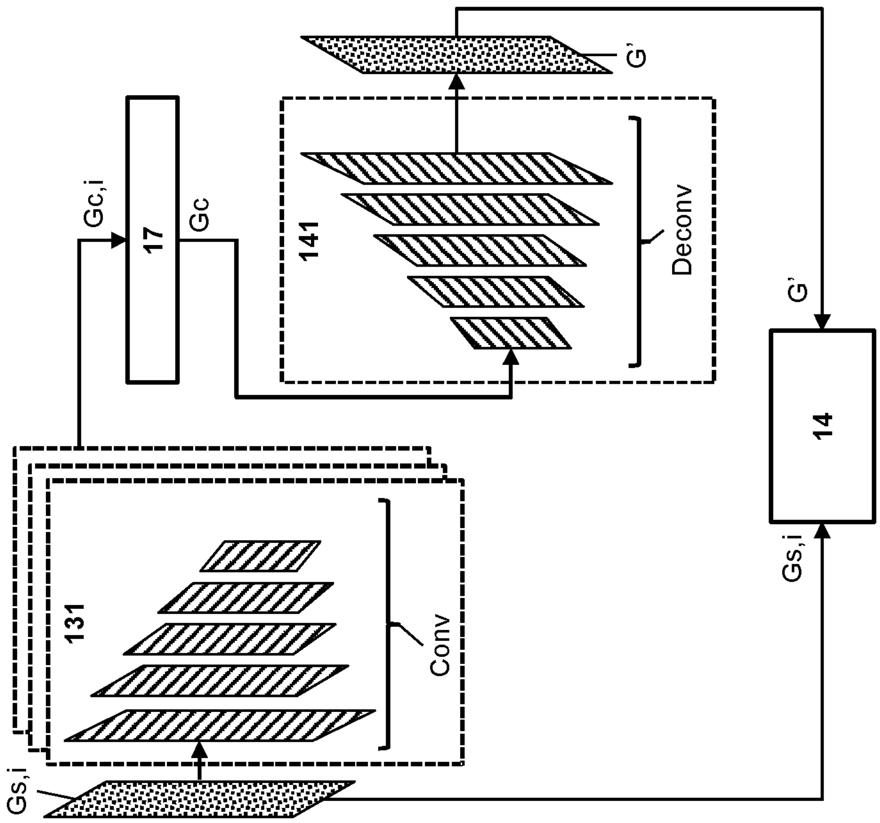
FIG. 12 shows an example architecture of the autoencoder of FIG. 11.
Figure 11:
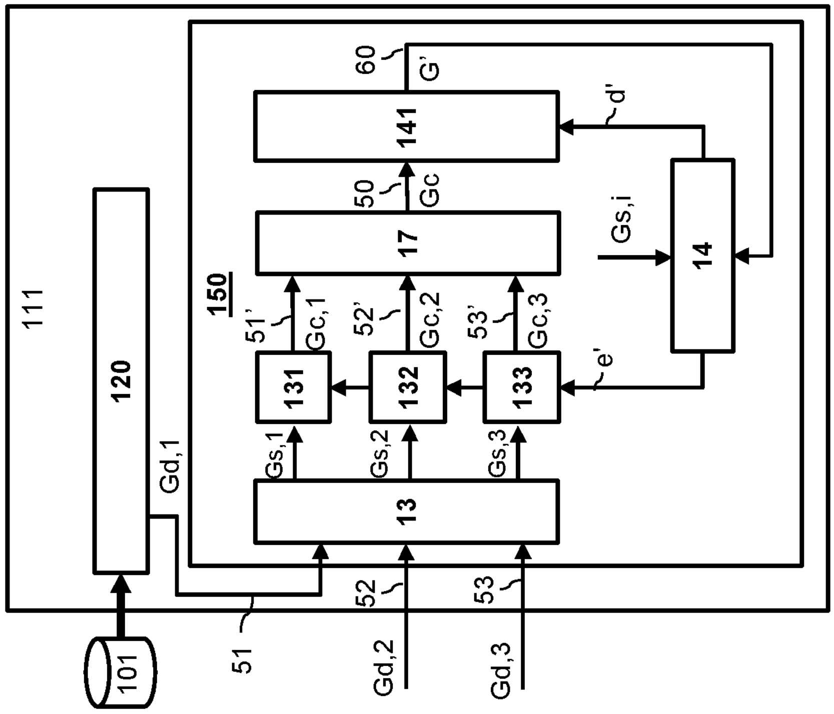
FIG. 11 shows an example embodiment of an autoencoder employed in the distributed learning system of FIG. 8 according to the present disclosure.
Figure 13:
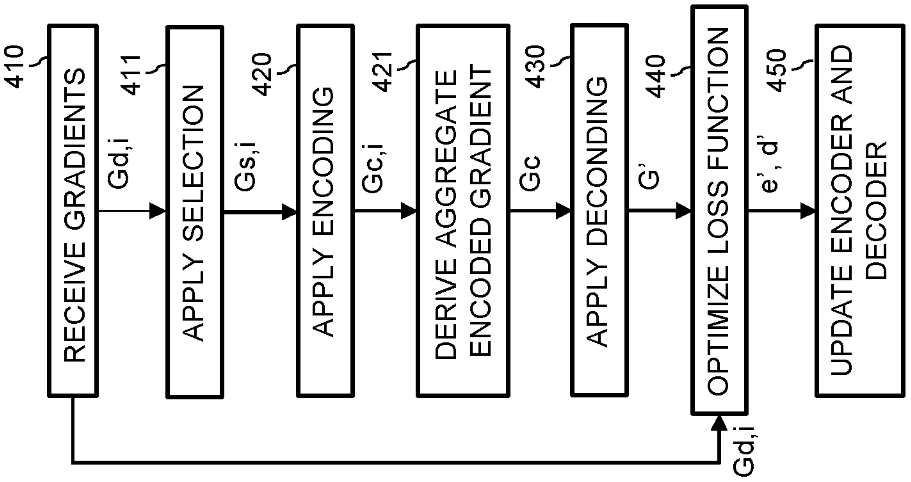
FIG. 13 shows steps according to an example embodiment of the present disclosure for training the autoencoder of FIG. 11.

The autoencoder and the method for training the autoencoder will be now described with reference to FIG. 11, FIG. 12, and FIG. 13. FIG. 11 shows an example architecture of the autoencoder, FIG. 12 shows its architecture in more detail, and FIG. 13 shows the steps performed for training the autoencoder.

As shown in FIG. 11, the autoencoder 150 comprises a coarse selector 13, encoders 131-133, one for each respective node, an aggregation circuit 17, a decoder 141, and a control logic 14 that encourages the encoders 131-133 to capture of the common information across the gradient information from the different nodes. An autoencoder architecture with encoders 131-133 respectively comprising five convolutional layers each of them with a one-dimensional kernel and a decoder 141 comprising five deconvolutional layers each of them a one-dimensional kernel may be adopted.

At each iteration, the autoencoder receives 410 gradient information 51-53 from the respective nodes 111-113. The gradient information may be uncompressed or compressed by the respective nodes by means of conventional compression techniques. Next, the coarse selector 13 derives 411 a coarse representation by selecting 411 the β% of the gradients with the highest magnitudes. Similar to above, the coarse selection may be performed by other suitable for this purpose algorithm. At each iteration of the autoencoder training, the coarse selection is performed based on the indices of the β% gradients with the highest magnitude for a node selected at random. For example, at the first iteration, the indices of the β% of the gradients of the gradient information Gd,1 of the node 111 may be used. By deriving the coarse representation from the gradient information of the other nodes based on the indices of the β% most significant gradient information of the selected node, coarse representations containing common information from the gradient information of the respective nodes is derived. The derived coarse representations Gs,i are then encoded 420 by the respective encoders 131-133, where the respective encoders 131-133 encode the corresponding coarse representations in the same manner, i.e. by employing the same encoding parameters. In other words, the encoders 131-133 may be considered as three instances of the same encoder. At each convolutional layer, the gradient information Gs,i is essentially downsampled to obtain an encoded gradient information Gc,i. For example, if the received gradient vector 121-123 comprises 100 gradients, its encoded representation may comprise 20 gradients. The respective encoded gradient information, Gc,i, are then aggregated 421 by the aggregation circuit 17. The resulting encoded gradient information, Gc, is then decoded 430 by the decoder 141. At each deconvolutional layer the encoded gradient information, Gc, is upsampled to finally obtain a decoder gradient information, Gi. The aggregated decoded gradient information as well as the original gradient information, i.e. Gs,i, are fed into the control logic 14 which minimizes 440 the differences between the respective original and decoded gradient information. As a result, three sets of encoding parameters one set for each encoder and one set of decoding parameters are derived. As mentioned above, the encoding parameters of each encoder are the same. In a final step 450, the node 111 forwards the encoding and decoding parameters with the other nodes within the distributed learning system. As a result, the encoder and decoder of the respective nodes are pre-set with the derived encoding and decoding parameters. The process is repeated until the differences between the respective original and decoded gradient information have reached have been minimized. Once the autoencoder is trained, the learning model may be trained based on the encoded gradient information.

Similar to other embodiments, the training of the autoencoder is done in parallel with the training of the learning model of the system. The training of the learning model may be performed in two stages or three stages. In the first case, the training starts by updating the learning model using the full gradient information derived from the respective computing nodes. At the same time, i.e., in parallel with the training of the learning model, the encoder-decoder model of the autoencoder is also trained based on the full gradient information. Once the encoder-decoder model has been trained, e.g., after 1000 or more iterations, the training of the learning model proceeds to the second stage where the learning model is updated based on the gradient information decoded by the trained encoder-decoder model. Thus, at the second stage, encoded gradient information is exchanged rather than full gradient information.

In the second case, the training starts by updating the learning model based on the full gradient information. After, for example, 1000 iterations, the training of the learning model proceeds to the second stage, where both the learning model and the encoder-decoder model are updated with gradient information compressed using a conventional compression technique. Once the encoder-decoder model of the autoencoder has been trained, e.g., after 100 to 300 iterations, the training of the learning model proceeds to the third stage with updating the learning model based on the gradient information encoded with the encoding parameters derived by the trained encoder-decoder model.

As used in this application, the term "circuitry" may refer to one or more or all of the following:

(a) hardware-only circuit implementations such as implementations in only analog and/or digital circuitry and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer implemented method for training a learning model based on training data by means of a distributed learning system comprising computing nodes, the computing nodes respectively implementing the learning model and deriving a gradient information, Gi, corresponding to a gradient of a loss function, for updating the learning model based on the training data, the method comprising:

encoding, by the computing nodes, the gradient information by exploiting a correlation across the gradient information from the respective computing nodes by means of an autoencoder model trained at a selected computing node by a control logic that implements a similarity loss function which estimates the similarities or the correlation across the gradient information from the respective computing nodes to extract gradient information common across the computing nodes;

exchanging, by the computing nodes, the encoded gradient information within the distributed learning system;

determining an aggregate gradient information, G', based on the encoded gradient information from the computing nodes; and updating the learning model of the computing nodes with the aggregate gradient information, thereby training the learning model.

2. The computer implemented method according to claim 1, wherein the distributed learning system operates according to a ring-allreduce communication protocol.

3. The computer implemented method according to claim 2, wherein:

the encoding comprises encoding, by the respective computing nodes, the gradient information, Gi, based on encoding parameters, thereby obtaining encoded gradient information, Gc,i, for a respective computing node;

the exchanging comprises receiving, by the respective computing nodes, the encoded gradient information, Gc,i−1, from the other computing nodes;

the determining comprises, by the respective computing nodes, aggregating the encoded gradient information from the respective computing nodes and decoding the aggregated encoded gradient information, G', based on decoding parameters.

4. The computer implemented method according to claim 1, wherein the distributed learning system operates according to a parameter-server communication protocol.

5. The computer implemented method according to claim 4, wherein the encoding comprises selecting, by the respective computing nodes, most significant gradient information from the gradient information, Gs,i, by selecting the gradients with the highest magnitudes, thereby obtaining a coarse representation of the gradient information, Gs,i, for the respective computing nodes, and encoding, by a selected computing node configured to act as a server node, the gradient information based on encoding parameters, thereby obtaining an encoded gradient information, Gc, 1;

the exchanging comprises receiving, by the server node, the coarse representations from the other computing nodes;

the determining comprises, by the server node, decoding the coarse representations and the encoded gradient information based on the decoding parameters, thereby obtaining decoded gradient information for the respective computing nodes, and aggregating the decoded gradient information, G',i.

6. The computer implemented method according to claim 4, wherein the encoding comprises selecting, by the respective computing nodes, most significant gradient information from the gradient information, thereby obtaining a coarse representation of the gradient information for the respective computing nodes, and encoding, by a selected computing node, the gradient information based on encoding parameters, thereby obtaining encoded gradient information;

the exchanging comprises receiving, by a further computing node configured to act as a server node, the coarse representations from the respective computing nodes and the encoded gradient information from the selected computing node; and the determining comprises, by the server node, decoding the coarse representations and the encoded gradient information based on the decoding parameters, thereby obtaining decoded gradient information for the respective computing nodes, and aggregating the decoded gradient information.

7. The computer implemented method according to claim 1, further comprising, by the respective computing nodes, compressing before the encoding the gradient information.

8. The computer implemented method according to claim 1, wherein the training further comprises deriving the encoding and decoding parameters from the autoencoder model.

9. The computer implemented method according to claim 8, wherein the training further comprises exchanging the encoding and decoding parameters across the other computing nodes.

10. The computer implemented method according to claim 1, wherein the training of the autoencoder model is performed in parallel with training of the learning model.

11. The computer implemented method according to claim 1, wherein the distributed learning system is a convolutional neural network, a graph neural network or a recurrent neural network.

12. A non-transitory computer readable storage medium comprising a computer program product comprising computer-executable instructions for causing a plurality of computing nodes forming a distributed learning system to perform the method according to claim 1 when the program is run on the plurality of computing nodes.

13. A distributed learning system comprising at least one processor and at least one non-transitory computer readable storage medium and a plurality of computing nodes implemented in the at least one processor and the at least one non-transitory computer readable storage medium, the plurality of computing nodes programmed for carrying out the method according to claim 1.

* * * * *